May 6, 1958  J. L. PATTON ET AL  2,833,698
HYDROCARBON HYDROCONVERSION WHERE PETROLEUM FRACTIONS ARE
TREATED IN PARALLEL REACTIONS WHILE PASSING HYDROGEN
SERIALLY THROUGH THE REACTORS
Filed April 27, 1954  2 Sheets-Sheet 1

INVENTORS
JAMES L. PATTON
BY CHARLES BEDNARS
G. H. Palmer
T. C. Virgil
ATTORNEYS

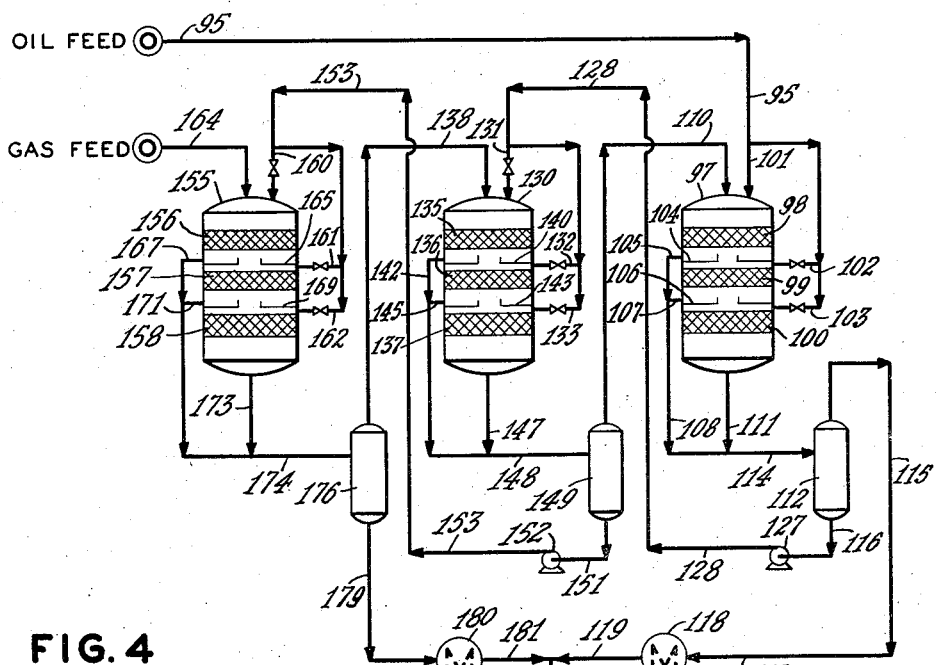

United States Patent Office 2,833,698
Patented May 6, 1958

2,833,698

HYDROCARBON HYDROCONVERSION WHERE PETROLEUM FRACTIONS ARE TREATED IN PARALLEL REACTIONS WHILE PASSING HYDROGEN SERIALLY THROUGH THE REACTORS

James L. Patton, Ramsey, N. J., and Charles Bednars, Port Washington, N. Y., assignors to The M. W. Kellogg Company, Jersey City, N. J., a corporation of Delaware Application April 27, 1954, Serial No. 425,956

13 Claims. (Cl. 196—28)

This invention relates to an improved method of contacting a chemical compound with a hydrogen containing gas whereby maximum utilization of the hydrogen is obtained and more particularly, it pertains to a process for converting hydrocarbons in the presence of hydrogen, for example, the desulfurization of hydrocarbon oils whereby a desired high ratio of hydrogen to sulfur containing hydrocarbon oil is maintained, although the total quantity of hydrogen charged to the process is relatively low in proportion to the amount of hydrocarbon being treated.

The present invention has wide application for systems in which a chemical compound is contacted with a hydrogen containing gas. Moreover, it is of particular importance for the improvement of desulfurization processes by virtue of the high degree of utilization of hydrogen obtained thereby. In desulfurization processes, it is preferred to maintain a high ratio of hydrogen to sulfur containing hydrocarbons, because high hydrogen partial pressure in the reaction zone has a favorable influence on the efficiency of desulfurization, the life of the catalyst and on the amount of carbon which is produced. At present, the cost of manufacturing hydrogen represents a substantial part of the investment and operating cost relating to a desulfurization process, consequently, there is need of a method of accomplishing the desulfurization reaction whereby smaller amounts of hydrogen are employed relative to the processes practiced heretofore. By means of this invention, the purpose set forth hereinabove is achieved substantially.

It is an object of this invention to provide a novel method of contacting a chemical compound with a hydrogen containing gas whereby a high degree of utilization of hydrogen is obtained.

Another object of this invention is to provide a method of converting hydrocarbons in the presence of a hydrogen containing gas whereby a high ratio of hydrogen to hydrocarbon is maintained, although the ratio of total hydrogen feed to total hydrocarbon feed is substantially less than is present in the conversion zone.

Another object of this invention is to provide a method of desulfurizing a hydrocarbon oil in the presence of hydrogen whereby a high degree of hydrogen utilization is obtained while maintaining a higher ratio of hydrogen to hydrocarbon in the desulfurization zone than the ratio of total hydrogen feed to total hydrocarbon feed to the process.

Other objects and advantages of this invention will become apparent from the following description and explanation thereof.

Our invention is practiced by contacting a portion of a chemical compound feed with hydrogen in a first contacting zone under desired conditions to produce a first effluent including a chemical compound and hydrogen, separating the hydrogen from the chemical compound in the first effluent and contacting at least another portion of the chemical compound feed with the separated hydrogen under desired conditions in a second contacting zone to produce a second effluent containing a chemical compound and hydrogen.

The method of the present invention can be applied to any system in which it is desired to contact a chemical compound with hydrogen for the purpose of reaction, heating, conditioning, cooling, drying, etc. The systems contemplated involve contacting a chemical compound with hydrogen under ambient conditions of temperature and pressure and superatmospheric temperatures and/or pressures. In any of these applications, it may be desirable, although not necessary, to maintain a specified ratio of hydrogen to chemical compound. In previously known systems, the ratio of hydrogen to chemical compound was determined by the total amount of hydrogen and the total amount of chemical compound which were charged to the system. By means of the present invention, the desired ratio of hydrogen to chemical compound can be maintained high relative to the total amount of hydrogen and chemical compound which are charged to the particular operation. In essence, this purpose is accomplished by passing a chemical compound in parallel flow through at least two contacting zones, and the hydrogen containing gas is passed serially through such contacting zones.

This invention has particular application to operations involving the conversion of a hydrocarbon in the presence of a hydrogen containing gas such as, for example, aromatization, hydrogenation, reforming or hydroforming, isomerization, cracking under hydrogen pressure, desulfurization, etc. In the case of hydrogenation, a particular example is the treatment of diesel oil to improve the cetane rating with or without desulfurization. Among the various processes which can utilize the method of the present invention, it is found that the desulfurization reaction is also particularly adaptable for this process. While it is true that certain desulfurization processes such as, for example, autofining, are operated under conditions to effect a net production of hydrogen, nevertheless, our invention can be used for any desulfurization system involving multi-reactors and employing hydrogen. This is especially true in the case of those desulfurization reactions in which a net consumption of hydrogen is obtained. Generally, for these kinds of systems, it is desired to maintain a high ratio of hydrogen to hydrocarbon and since the cost of manufacturing hydrogen is high, the incentive is to improve the process in the direction of effecting efficient desulfurization by using lower ratios of hydrogen to hydrocarbon. An example of this type of a process is the so-called "Trickle" process disclosed and described in U. S. Patent No. 2,608,521, hence, the present invention is of a special utility for those desulfurization processes in which a net consumption of hydrogen is effected and it is desirable to maintain a high ratio of hydrogen to hydrocarbon in producing desulfurization.

In operating the method of the present invention, the chemical compound to be contacted with the hydrogen can be maintained as either a liquid, vapor or mixed liquid-vapor state under contacting conditions. In the case where a hydrocarbon is converted in the presence of a hydrogen containing gas, the temperature of treatment can be varied from about 350° to about 1250° F., at a pressure of about 1 atmosphere to about 4000 p. s. i. g., a weight space velocity of about .01 to about 25, measured as the pounds of hydrocarbon charged to the conversion zone on an hourly basis per pound of catalyst present therein, and in the case of a moving bed system, a catalyst to oil ratio on a weight basis, of about .05 to about 20. In the event that a catalytic material is not employed in the process, in general, for any of the processes contemplated hereunder, the ratio of hydrogen to hydrocarbon, on a molar basis, can range from about .001 to about 100.

The catalyst to be used for the purpose of converting the hydrocarbons can be any of those well-known in the art, such as, for example, in cracking hydrocarbons under hydrogen pressure, siliceous catalysts including, e. g., silica-alumina. The reforming or hydroforming reaction can be conducted with platinum supported on alumina catalyst or molybdenum trioxide or chromia supported on alumina. The desulfurization reactions may be conducted by means of chromia, molybdenum trioxide, nickel molybdate supported on alumina, nickel tungstate-alumina, cobalt molybdate-alumina, etc.

The desulfurization reaction in which the present invention is used can employ a temperature of about 550° F. to about 1000° F., a pressure of about 25 to about 2000 p. s. i. g., a weight space velocity of about .05 to about 20 and, in the case of a moving bed system, a catalyst to oil ratio of about .01 to about 15. The hydrogen which is charged to the system can be from about 300 to about 20,000 standard cubic feet of hydrogen (60° F. and 760 mm.) per barrel of oil feed (1 barrel equals 42 gallons), abbreviated as s. c. f. b. The catalytic material can be any suitable desulfurization catalyst including those which are hydrogenation catalysts such that the sulfur impurities are either absorbed by the catalyst and/or hydrogenated to produce hydrogen sulfide which is evolved as a product of the process. The catalysts which can be used for this purpose are, for example, platinum and/or palladium supported on alumina, a group VI metal compound including, for example, the oxide and/or sulfide of the left hand elements thereof, specifically, chromia and/or molybdenum trioxide supported on alumina; the group VI metal compound can be promoted with a compound of a metal of group VIII having an atomic number not greater than 28 such as, for example, the oxides and/or sulfides of iron, cobalt and nickel. Another suitable class of catalysts are the heteropoly acids which have molybdenum, chromium, vanadium and/or tungsten as the outer acid forming element, and phosphorus, silicon, germanium, platinum, etc., can be present as the central acid forming element. Examples of the heteropoly acids are phosphomolybdic acid, phosphotungstic acid, either alone or supported on a carrier material such as, for example, silica-alumina.

An effective method of desulfurizing sulfur containing hydrocarbon oils where the hydrogen supply is limited involves the use of a low hydrogen rate and a low oil rate, such that the hydrogen to oil ratio in the desulfurization zone is maintained within the limits where effective desulfurization is achieved. This method of desulfurization can be used in systems other than what is contemplated by means of this invention. For this purpose, the hydrogen containing rate can vary from about 300 to about 2000 s. c. f. b., more usually, about 300 to about 750 s. c. f. b. The hydrogen can be processed by recycle of unreacted material and/or as a once-through operation. The temperature of the treatment is about 650° to about 750° F.; the total pressure of the system is about 200 to about 700 p. s. i. g., more usually, about 300 to about 425 p. s. i. g., and the weight space velocity varies from about 0.5 to 20.0. In the case of a group VI metal compound, e. g., $MoO_3$ or tungsten sulfide, the weight space velocity is preferably about 0.5 to 5.0; whereas in the case of a platinum catalyst it is preferably about 1 to 20 $W_o/hr./W_c$. These conditions of operation are especially suitable for a system in which it is desired to effect not more than about 70 to about 80% desulfurization. The conditions are carefully selected such that the hydrogen to hydrocarbon ratio, on a molar basis, is about 0.3 to about 3.3, preferably about 0.5 to about 1.2, in order that effective desulfurization is obtained, the life of the catalyst is not adversely influenced and the production of carbon is kept at a minimum.

The hydrocarbon to be desulfurized by means of the present invention includes gasoline, naphtha, kerosene, gas oil, cycle stocks from catalytic cracking or thermal cracking operations, residual oils, etc. The sulfur concentrations of these hydrocarbon stocks can vary from about .03 to about 10% by weight. In the case of using low hydrogen and hydrocarbon feed rates to provide a hydrogen to hydrocarbon molar ratio in the range of about 0.5 to about 1.2, it is found that these conditions are especially adapted for treatment of hydrocarbon stock having a gravity of about 20 to 40° API and a sulfur concentration of about 0.5 to about 3.0% by weight such as, for example, gas oils and light catalytically cracked cycle stocks. However, it should be understood that other feed stocks can be used. It is to be expected that the boiling range of the hydrocarbon feed to any of the desulfurization processes contemplated for this invention will vary considerably such that the initial boiling point varies from about 70° to about 800° F. and the end point may vary from about 250° to about 1400° F., as atmospheric pressure.

As previously mentioned, the conditions under which the hydrogen containing gas is contacted with the chemical compound include maintaining the chemical compound in a liquid, vapor or mixed liquid-vapor state. Further, while maintaining the chemical compound or hydrocarbon in the liquid state, the contact with the hydrogen containing gas can be effected under either co-current or countercurrent conditions. In the case of vapor phase contact, the hydrogen containing gas is contacted therewith under co-current flow conditions. It is also contemplated, by means of this invention, to effect in the same operation countercurrent flow between the liquid chemical compound or hydrocarbon and the hydrogen, and in another zone providing co-current contact between vaporous chemical compound or hydrocarbon and the hydrogen containing gas.

In the present invention, a multi-reactor system or multi-contacting zone operation is contemplated since it is necessary to pass the chemical compound in parallel flow through the contacting zones; whereas the hydrogen flows serially therethrough. There is at least two reactors or contacting zones and the number can be as high as desired, the only limitation being that the expense would not warrant employing beyond a certain number of contacting zones. The amount of chemical compound charged to each reactor or contacting zone relative to the other parallel stream or streams may be the same or the parallel streams can vary in relative quantities as desired. In the case where hydrogen is consumed in the total operation, it may be desirable to reduce the flow of chemical compound passing to the zones or reactors which are farther removed from the fresh hydrogen supply in order to maintain a constant ratio of hydrogen to chemical compound. Also, the ratio can be increased or decreased, depending upon the results desired. The passage of hydrogen containing gas through a series of reactors or contacting zones will result in a lowering of total pressure in each subsequent zone or reactor, unless efforts are made to restore operating pressure to a desired level. In some cases, it may be desirable to establish a progressively lower pressure in the serial flow of the hydrogen such that this hydrogen stream can flow continuously without the aid of pumps or compressors. On the other hand, the pressure in each reactor or contacting zone can be equal to the rest and this can be effected by repressurizing the hydrogen stream after being used in a previous contacting zone.

In order to provide a better understanding of this invention, reference will be had to the accompanying drawings which form a part of this invention and include:

Figure 3 is a flow arrangement in which a multi-reactor system is employed involving a plurality of catalyst beds within each reactor and providing for co-current contact between hydrogen and oil therein while the flow of oil feed passes countercurrently to the flow of hydrogen in the system; and Figure 4 is illustrative of a system in which countercurrent contact between hydrogen and the liquid portion of the hydrocarbon feed is effected in one zone; whereas, co-current flow in a vaporous state is effected in the second zone.

It should be understood that the following description relating to Figures 1 to 4 is intended to apply to any system broadly, i. e., where a chemical compound is contacted with hydrogen, with or without the presence of hydrogen, and for any purpose of treatment, as well as to any specific process for which such method is applicable.

Figure 1:
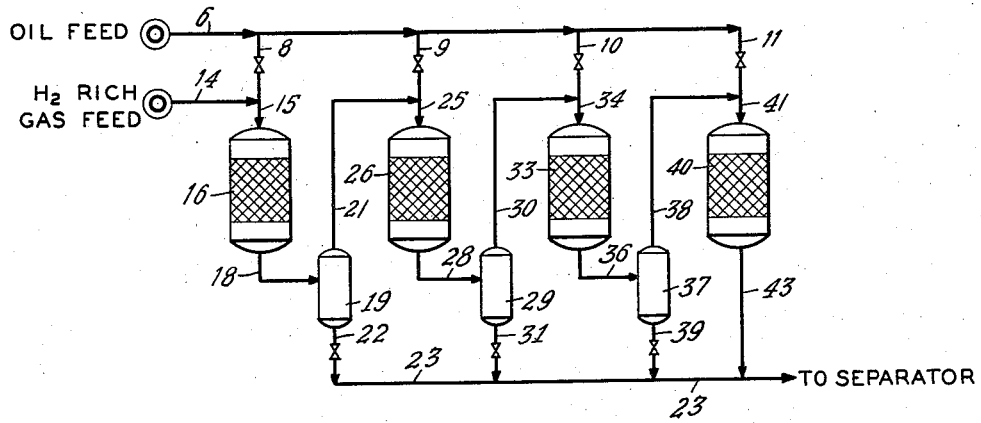
Figure 1 is an illustration of a multi-reactor system in which co-current contact between hydrogen and oil feed is maintained.

In Figure 1, a gas oil feed having an API gravity of 30° is supplied by means of line 6 at the rate of 2000 barrels per day. This gas oil feed contains about 1.4 by weight percent of sulfur and it is desired to reduce the sulfur concentration by 80% or thereabouts. The oil feed is introduced at a temperature of about 700° F. and at a pressure of about 350 p. s. i. g. The total feed is divided such that substantially equal portions thereof are fed simultaneously through valved lines 8, 9, 10 and 11. Hydrogen containing gas, having approximately 70–90% by volume of hydrogen, is supplied from a source 14 at a rate of about 500 s. c. f. b. relative to the total oil feed being supplied by means of line 6. This hydrogen containing gas exists at a temperature of 700° F. and at a pressure of 350 p. s. i. g. The total hydrogen stream and the portion of oil feed passing through line 8 are combined in line 15 prior to entering the top of reactor 16 in which there is situated a bed of granular cobalt molybdate supported on alumina catalyst. This catalyst contains approximately 3.5% by weight of cobalt oxide and 9% by weight of $MoO_3$. By reason that the oil feed is a straight run or virgin gas oil, there is little or no hydrogenation of the hydrocarbon compounds. The hydrogenation of the sulfur compounds to produce hydrogen sulfide and a hydrocarbon fragment involves endothermic and exothermic reactions; consequently, it may be expected that the temperature in reactor 16 will not vary significantly.

The desulfurized liquid product and the hydrogen stream are discharged from the bottom of reactor 16 by means of line 18 and the entire product stream is passed to a separator 19. In the separator, the hydrogen containing gas stream is separated from the liquid product and it is discharged overhead therefrom by means of line 21. The liquid product contained in separator 19 is discharged from the bottom thereof by means of line 22, and thence it flows into a main product line 23. The separated hydrogen gas stream flowing in line 21 is then combined with the portion of liquid feed flowing through line 9, and thus the resultant mixture is passed through line 25 to the top of a second reactor 26. Reactor 26 contains the same type of catalyst as reactor 16 as well as the same quantity, on a weight and volumetric basis. The temperature in reactor 26 will be fairly close to the temperature existing in reactor 16 except for any drop which may occur as a result of heat losses. In this example, the temperature in reactor 26 is 700° F. The flow of hydrogen containing gas from reactor 16 to reactor 26 is facilitated by maintaining reactor 26 at a lower pressure than reactor 16. In this example, the average pressure of reactor 16 is 330 p. s. i. g.; whereas the pressure in reactor 26 is 320 p. s. i. g. The desulfurized liquid product along with the hydrogen containing gas stream is discharged from the bottom of the reactor 26 by means of line 28 and the entire mixture is passed to a second separator 29. In the second separator, the hydrogen containing gas is separated from the liquid product and then it is discharged therefrom by means of overhead line 30. The desulfurized liquid product is yielded from the bottom of the separator 29 by means of a valved line 31, and then it is passed to the main product line 23. The separated hydrogen containing gas stream flowing through line 30 is then combined with the portion of oil feed flowing through line 10 and the resultant mixture flows to the top of a third reactor 33 by means of line 34. The weight and volume of catalyst employed in reactor 33 is the same as in reactors 16 and 26. The temperature for the reasons given hereinabove is maintained at 700° F.; whereas the pressure is less than exists in reactor 26, namely, about 310 p. s. i. g. The total reaction product is discharged from the bottom of reactor 33 through line 36 and it passes to a third separator 37. As in previous cases, the hydrogen containing gas is separated and discharged from the separator 37 by means of line 38 and the desulfurized liquid product is yielded from the bottom of the separator by means of valved line 39. The hydrogen containing gas which is discharged from separator 37 is combined with the fourth portion of oil feed flowing through line 11 and the resultant mixture is passed to the stop of a fourth reactor 40 by means of line 41. The last reactor 40 contains the same type of catalyst as in the previous reactors and the same quantity of catalyst on a weight and volumetric basis. The temperature in this reactor is at about 700° F. and the pressure is 300 p. s. i. g. The total quantity of catalyst which is present in reactors 16, 26, 33 and 40 relative to the total quantity of oil feed which is supplied by means of line 6, provides a weight space velocity of about 3.0. The ratio of hydrogen to oil feed on a molar basis is 1; however, by virtue of the division of oil feed such that only one quarter passes through each reactor, this ratio is increased to 4 on a smaller basis. The reaction product flows from the bottom of reactor 40 by means of line 43 and the entire mixture is discharged into the bottom of line 23. Consequently, the liquid product and normally gaseous product material from the desulfurization operation are ultimately combined and passed as a single stream to a product recovery system, not shown.

In the case of the operation illustrated in Figure 1, under some conditions, it may be necessary to effect cooling or heating between the reaction zones. In such cases, it is contemplated installing a cooler or a heater, e. g., a furnace, for this purpose. Where a cracked stock such as a catalytically cracked cycle oil is processed in accordance with the procedure given, it is to be expected that a net exothermic effect is produced by virtue of the unsaturated hydrocarbons contained in this material being hydrogenated.

Figure 2:
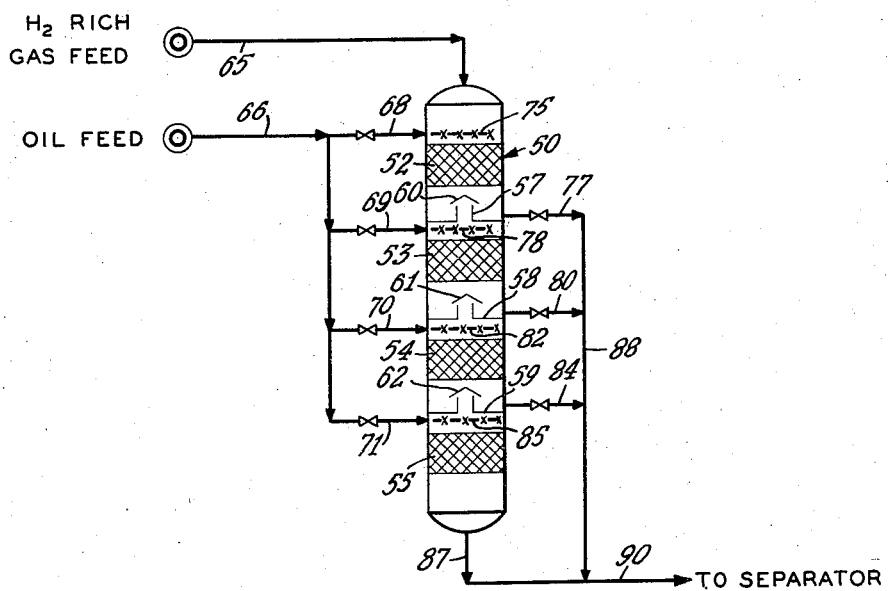
Figure 2 is another embodiment in which co-current contact between hydrogen and hydrocarbon material is maintained.

Figure 2 is an illustration of another embodiment of the system in which oil feed is passed co-currently to the hydrogen containing gas. The conditions of temperature, pressure, weight space velocity and kind of catalyst, as well as quantity thereof, are essentially the same for the operation in Figure 2 as given in Figure 1. In Figure 2, the reactor comprises a unitary structure or vessel 50 in which there is situated a series of catalyst beds 52, 53, 54 and 55, situated one above the other. These catalyst beds are separated from each other by means of donut shaped trays 57, 58 and 59 having superimposed above the opening thereof conically shaped baffles 60, 61 and 62. In the operation of the system shown in Figure 2, the total hydrogen feed is supplied by means of line 65, and it is passed to the top of the reactor vessel 50. The oil feed is supplied from a main source 66 and it is divided into four portions for passage through valved lines 68, 69, 70 and 71. The size and quantity, i. e., weight and volume of catalyst beds 52, 53, 54 and 55, are the same for the purpose of this illustration; however, the quantity of oil feed being passed through the individual supply lines 68, 69, 70 and 71 are proportioned such that the weight space velocity is constant in each catalyst bed. It is to be expected that the quantity of hydrogen reduces as this stream is passed successively through the catalyst zones. The decrease in the quantity of hydrogen is compensated by reducing the quantity of oil feed being charged to a particular catalyst zone. The reduction in hydrogen is due mainly to the consumption thereof resulting from conversion of the sulfur compounds to hydrogen sulfide. Accordingly, the portion of oil feed passing through line 68 enters reactor 50 above bed 52 by means of a distributor 75. The oil feed combines with the hydrogen containing gas being supplied through the top of the reactor and the entire mixture passes downwardly through catalyst bed 52. The desulfurized liquid product collects on donut tray 57, and it is discharged from the reactor by means of a valved line 77. The hydrogen containing gas passes through the opening in the donut tray 57 and it flows downwardly for admixture with a second portion of liquid feed being introduced through distributor 78. The quantity of oil feed which is passed to catalyst bed 53 is less than in the case of bed 52. The mixture of reactants pass downwardly through bed 53 and the desulfurized liquid product collects on donut tray 58. This product is discharged from the reactor by means of a valved line 80. The hydrogen containing gas passes through the opening of donut tray 58 and it is then combined with oil feed being introduced above catalyst bed 54 by means of distributor 82. The reaction product is discharged from the bottom of bed 54 and the desulfurized liquid accumulates on donut tray 59. This product material is discharged from the reactor by means of a valved line 84. The hydrogen containing gas which is separated from the reaction product is passed through the opening of donut tray 57 and then it is combined with the oil feed being introduced through a distributor 85 which is situated above bed 55. The reaction product is discharged from catalyst bed 55, and thence it is yielded from the bottom of reactor 50 by means of line 87. Those portions of liquid product which are yielded from the reactor via lines 77, 80 and 84 are combined in the main product line 88 and then this product stream is combined with the reaction product being discharged from the bottom of the reactor by means of line 87 and the entire mixture is passed through product line 90 whereby the total product material is sent to a product recovery system, not shown.

Figure 3 is an illustrative embodiment in which the flow of hydrogen is countercurrent to the flow of oil feed. The conditions of operation, namely, temperature, pressure, etc., are the same as given hereinabove in connection with Figure 1. The oil feed is supplied by means of line 95 and it passes to a reactor 97 in which there is situated three catalyst beds 98, 99 and 100, one superimposed over the other. The total oil feed is divided to provide three equal portions, such that the oil passing through a line 101 is processed in bed 98, the second portion of oil feed passing through valved line 102 is contacted with bed 99 and the third portion of oil feed is contacted with bed 100 by passing through valved line 103. That portion of the feed material which is converted in bed 98 accumulates on a donut shaped tray 104 and it is removed therefrom by means of a line 105. Similarly, the feed material being processed in catalyst bed 99 collects on donut tray 106 and the liquid product is withdrawn from this tray by means of line 107. The product streams in lines 105 and 107 combine and flow through line 108. The hydrogen containing gas is introduced into the top of this reactor 97 by means of line 110. It can be seen that the hydrogen containing gas passes through each catalyst bed within the reactor in succession; whereas, the liquid feed material is divided to permit only a portion of the feed material to be contacted with the total hydrogen containing gas stream within each catalyst zone. The reaction product and all of the unreacted hydrogen is withdrawn from the bottom of reactor 97 by means of line 111 and this material is combined with liquid product in line 108 and the entire mixture is passed to a separator 112 by means of line 114. The hydrogen containing gaseous material is withdrawn from the separator by means of overhead line 115, whereas the liquid product is yielded from the bottom of separator 112 by means of line 116. The hydrogen containing gas stream flowing in line 115 is first reduced in temperature by means of indirect heat exchange in heat exchanger 118 and then it passes through lines 119 and 120 prior to being cooled again by means of a condenser 121. The cooled hydrogen containing gas stream passes from condenser 121 to an accumulator 122 by means of line 123. The normally liquid product material which is contained in the gas stream and which is condensed in condenser 121 is separated in the accumulator 122, and it is withdrawn therefrom by means of a bottom line 124. The gaseous product is withdrawn from the top of the accumulator by means of line 125. These product streams are passed to a product recovery system, not shown.

The liquid product which is yielded from the bottom of separator 112 and which flows from line 116, is conveyed by means of pump 127 through line 128 for further treatment in a second reactor 130. The incompletely treated liquid material is divided such that substantially equal oprtions are passed through valved lines 131, 132 and 133 for further treatment in the reactor which contains three catalyst beds 135, 136 and 137. The size and kind of catalyst comprising these beds are the same as is present in reactor 97. The hydrogen containing gas is supplied to this reactor by means of line 138. The incompletely treated liquid material flowing through line 131 is contacted with the hydrogen containing gas in catalyst bed 135, and thence the liquid material accumulates on donut tray 140; whereas the hydrogen containing gas flows through the opening in this tray to the lower positioned catalyst bed. The product material on tray 140 is removed therefrom by means of a line 142. The incompletely treated liquid material flowing through line 132 is contacted with the hydrogen containing gas in bed 136; therefore, the liquid product material accumulates on donut tray 143 and the hydrogen containing gas flows through the opening thereof to the lower positioned bed 137. The product material accumulating on tray 143 is withdrawn therefrom by means of line 145. The liquid material to be further processed in the lower catalyst bed 137 is introduced thereto by means of line 133, and after it is contacted with the catalyst bed in the presence of the hydrogen containing gas, it is discharged from the bottom of the reactor by means of line 147. The treated materials flow through lines 142 and 145 and are combined with the product in line 147, and the entire mixture flows through line 148 to a second separator 149. The hydrogen containing gaseous material is withdrawn from the top of the separator by means of line 110 and is used in reactor 97. The liquid product material is withdrawn from the bottom of the separator through line 151 and it is transported by means of pump 152 through line 153 for further processing in a third reactor 155. Reactor 155 contains three catalyst beds, 156, 157 and 158, each bed located above the other and comprised of the same catalytic material and quantity thereof as indicated hereinabove for reactor 97. The liquid material to be further processed is divided such that equal portions pass through valved lines 160, 161 and 162. The hydrogen containing gas is freshly supplied from a source 164 and it passes to the top of reactor 155. The liquid material to be treated and the hydrogen containing gas are contacted with bed 156 and then the liquid product collects on donut tray 165; whereas the hydrogen containing gas passes through the opening thereof to the lower positioned bed 157. The liquid product on tray 165 is withdrawn therefrom by means of line 167. The hydrogen containing gas and liquid material to be treated, which are flowing through line 161, are contacted in catalyst bed 157 and, thence, the liquid reaction product accumulates on donut tray 169; whereas the hydrogen containing gas flows through the opening thereof to the lower bed 158. The liquid product on tray 169 is withdrawn therefrom by means of line 171. The liquid material to be treated in catalyst bed 158 is passed from line 162 and, after being processed with the hydrogen containing gas, it is withdrawn from the bottom of the reactor by means of line 173. The product material in line 167 and that flowing in line 173, are combined, and the entire mixture flows through line 174 and thence to a third separator 176. The hydrogen containing gaseous material is withdrawn from the top of the separator by means of line 138 and it is further processed, as previously described. The total liquid product is removed from the bottom of the separator by means of line 179 and then its temperature is reduced by means of heat exchanger 180, prior to passing through lines 181 and 120 for further cooling in condenser 121, as previously mentioned. The operation described in Figure 3 is illustrative of a system in which the total hydrogen supply flows countercurrently to the total oil feed. However, the oil feed is divided into three portions for processing within the reactor under conditions simulating a high hydrogen to hydrocarbon ratio.

In Figure 4, the operation is illustrative of a system in which a portion of the liquid to be treated is vaporized, and it is co-currently contacted with hydrogen containing gas; whereas the remaining liquid feed is contacted countercurrently to the total hydrogen containing gas stream. The operation is cyclic, in that while one reactor is processing the oil feed, the other is undergoing regeneration for restoring the properties of the catalyst. In this example, temperature, pressure and other conditions of operation are the same as previously described in connection with Figure 1. The oil feed is fed from line 185 and it passes to line 186, because valve 187 in line 188 is in a closed position. Valve 190 in line 186 is maintained open such that the oil feed in a mixed phase, that is, vapor and liquid, is discharged therefrom by distributor 191 into a reactor 192. This reactor contains two catalyst beds, an upper smaller bed 193 and a lower larger bed 194. The size of the beds is proportioned in accordance with the amount of oil feed which is vaporized; consequently, the severity of treatment in bed 193 will approximate that of bed 194. The hydrogen containing gas stream is supplied from line 196 and it passes through line 197 and valve 198. This hydrogen stream does not flow from line 197, because the valve 200 situated therein is in a closed position. The portion of the oil feed which is in a liquid state flows downwardly to bed 194 in countercurrent relationship to the hydrogen containing gas flowing upwardly therein from line 197. The hydrogen containing gas passes from bed 194 to bed 193 and thence it contacts the vaporous portion of the feed in bed 193. The hydrogen containing gas is discharged from the top of reactor 192 through line 202 and thence through line 203 containing an open valve 204 for passage through line 206. The hydrogen containing gas in line 206 flows to line 207 which leads to a product recovery system, not shown.

The treated liquid material is discharged from reactor 192 by means of line 210 and thence it passes through line 211 containing an open valve 212. This treated liquid material is discharged from line 211 to line 207 wherein it combines with the treated oil vapors and hydrogen containing gas flowing from line 206. The entire mixture is passed to a product recovery system, not shown.

While reactor 192 is in the process cycle, a second reactor 215 is undergoing regeneration. In this connection, a supply of air and steam is fed from a source 217 and thence it flows through line 218 in which there is contained an open valve 219. This regeneration gas does not flow through line 220, because valve 21, which is contained therein, is in a closed position. The regeneration gas passing through line 218 then flows to the top of reactor 215 by means of line 225. This regeneration gas does not back-flow into line 226, because a valve 227 installed in this line is kept closed. Reactor 215 contains catalyst beds 230 and 231 of the same size, quantity and type of catalyst as described in connection with reactor 192. The regeneration gas passes downwardly through the catalyst beds in succession; thus, the carbonaceous and sulfurous material deposited on the catalyst is removed by burning. The flue gas produced by combustion is discharged from the bottom of reactor 215 through line 233 and thence it flows through a line 234 containing an open valve 235 and it is vented from the system. The flue gas stream does not flow through line 236, because this line contains a closed valve 238. When reactor 192 is being regenerated, the flue gas is discharged from the system by means of line 240 which contains valve 241.

Another important application of this invention involves the simultaneous treatment of dissimilar stocks with the same hydrogen stream. For example, in any of the processes described hereinabove, e. g., hydrogenation, hydroforming, desulfurization, etc., or in any hydrocarbon conversion process, dissimilar hydrocarbon stocks can be treated with the same hydrogen stream in separate zones or reactors. In the case of desulfurization, where it is desired to desulfurize a gas oil, kerosene or heater oil, light catalytically cracked cycle oil or residual oils in combination with a lighter boiling hydrocarbon material, e. g., gasoline or naphtha, the dissimilar stocks are passed in parallel arrangement through separate processing zones or reactors in liquid, vapor or mixed liquid-vapor phase and hydrogen is passed through each zone or reactor serially. The lighter hydrocarbon may be treated first with the hydrogen stream or it can be contacted with the hydrogen stream subsequent to contact with the heavier hydrocarbon stock. An important application of this invention involves simultaneous desulfurization of a naphtha or gasoline and a gas oil, heater oil or light catalytically cracked cycle oil. The hydrogen to be used for this treatment is derived from a hydroforming operation in which a sulfur sensitive reforming catalyst, e. g., platinum on alumina, is employed. The reforming catalyst contains 0.1 to 10% by weight of platinum. The hydroforming reaction is effected at a temperature of 800° to 1000° F., a pressure of about 25 to 1000 p. s. i. g., more usually, about 50 to 500 p. s. i. g., a hydrogen rate of 500 to 10,000 s. c. f. b. (standard cubic feet of hydrogen, 60° F. and 760 mm. Hg, per barrel of oil feed; 1 barrel equals 42 gallons), a weight space velocity of 0.1 to 15 and in the case of a moving bed system fluid or non-fluid, a catalyst to oil ratio, on a weight basis, of 0.01 to 5. The conditions of treatment for the relatively heavier hydrocarbon material and the light hydrocarbon oil to be reformed may be the same or different, depending on the optimum conditions for treating each stock. The type of reactor shown in Figure 4 is well suited for this kind of operation. The column is divided into two major zones, the upper zone being used for desulfurization of naphtha in the vapor state and the lower zone is used for desulfurizing gas oil or cracked cycle oil in the liquid state. The hydrogen first passes through the lower zone and then it passes into the upper zone.

Having thus described our invention by providing specific examples thereof, it should be understood that no undue limitations or restrictions should be imposed by reason thereof, but that the scope of this invention is defined by the appended claims.

We claim:

1. A process for desulfurizing a sulfur-containing hydrocarbon oil feed which comprises separating said feed into a plurality of separate portions of substantially the same boiling range, contacting one portion of said oil feed with a mass of hydrogenation catalyst in the presence of added hydrogen under suitable desulfurization conditions including superatmospheric pressure such that a desulfurized product and unreacted hydrogen are obtained, separating hydrogen containing gas from the desulfurized product under essentially the pressure of reaction, recovering said desulfurized product, contacting another portion of said hydrocarbon oil feed with the separated hydrogen-containing gas under liquid phase desulfurization conditions with a second mass of hydrogenation catalyst in a second desulfurization zone operated at a lower pressure than the first desulfurization zone, thereby providing a pressure differential sufficient for the flow of hydrogen-containing gas from the first to the second desulfurization zone.

2. A process for desulfurizing a sulfur containing hydrocarbon oil feed which comprises dividing said oil feed into separate portions of substantially the same composition, contacting one portion of said oil feed with a mass of hydrogenation catalyst in the presence of added hydrogen under suitable desulfurization conditions in a first desulfurization zone to produce a product including desulfurized hydrocarbon product and hydrogen, separating hydrogen from the desulfurized hydrocarbon product, contacting another portion of the oil feed with the separate hydrogen under desulfurization conditions in a second desulfurization zone containing a mass of hydrogenation catalyst, the ratio of oil feed to hydrogen in the second desulfurization zone being substantially the same as in the first desulfurization zone and recovering from the second desulfurization zone a product including desulfurized hydrocarbons and hydrogen.

3. A process for upgrading separate portions of a hydrocarbon feed of substantially the same composition in the presence of hydrogen which comprises contacting one portion of said hydrocarbon feed with a mass of hydrogenating catalyst with added hydrogen under suitable conversion conditions in a first conversion zone to produce an upgraded hydrocarbon product containing hydrogen, separating hydrogen from said hydrocarbon product, contacting a second portion of said hydrocarbon feed with the hydrogen separated from said first conversion zone product with a second mass of hydrogenating catalyst under suitable conversion conditions in a second conversion zone involving the same process as in the first zone to produce a second upgraded hydrocarbon product for hydrogen.

4. A process for converting a sulfur containing hydrocarbon oil feed with hydrogen which comprises separating said oil feed into separate streams of similar composition, contacting one of the oil feed streams in the presence of added hydrogen with a catalyst under suitable conversion conditions in a first conversion zone to produce a product including desulfurized hydrocarbons and hydrogen, separating hydrogen from the hydrocarbon product, passing the separated hydrogen with another of the oil feed streams into a second mass of catalyst under conversion conditions to produce a second hydrocarbon product stream containing hydrogen and recovering a combined hydrocarbon product of said first and second conversion zone as a product of the process.

5. A desulfurization process which comprises passing a sulfur containing hydrocarbon and added hydrogen through a mass of desulfurization catalyst under liquid phase desulfurization conditions in a first zone to produce and recover a first desulfurized hydrocarbon product from one part of said zone and hydrogen from another part of said zone, passing the hydrogen from the first zone to a second zone in contact with a second sulfur containing hydrocarbon feed under vapor phase desulfurization conditions in contact with a second mass of desulfurization catalyst and recovering a desulfurized hydrocarbon product and hydrogen from said second zone.

6. A process for desulfurizing a hydrocarbon feed in the presence of hydrogen which comprises dividing said hydrocarbon into a plurality of separate hydrocarbon feed streams, passing one of said hydrocarbon feed streams with hydrogen to a first conversion zone under suitable conversion conditions including a superatmospheric pressure and net hydrogen consumption such that a product including hydrocarbons and hydrogen is obtained, separating hydrogen from the hydrocarbon product of the first conversion zone, passing the separated hydrogen with another of said hydrocarbon feed streams to a second conversion zone involving the same process as in the first conversion zone under suitable conversion conditions including a pressure which is lower than the pressure in the first conversion zone to provide a pressure differential sufficient for the flow of hydrogen from the first to the second conversion zone and recovering a hydrocarbon product and hydrogen from said second conversion zone.

7. A process for upgrading a hydrocarbon feed in the presence of hydrogen which comprises partially vaporizing said hydrocarbon feed, passing the liquid portion of the hydrocarbon feed and hydrogen to a first contacting zone such that the hydrogen flows countercurrent to said liquid hydrocarbon feed, thereby recovering a hydrogen-containing gas from one end of said contacting zone and a liquid hydrocarbon product from the other end of said zone, passing the hydrogen containing gas from the first contacting zone with the vaporous portion of said hydrocarbon feed to a second contacting zone involving the same process as in the first zone to produce a second upgraded hydrocarbon product including hydrogen.

8. A process for simultaneously desulfurizing dissimilar hydrocarbon stocks which comprises passing one of said stocks to a first desulfurization zone in the presence of a hydrogen-containing gas under suitable desulfurization conditions to produce a desulfurized hydrocarbon product including hydrogen, separating the hydrogen from the desulfurized product, passing the other hydrocarbon stock to a second desulfurization zone, passing all of the hydrogen separated from the first zone to the second desulfurization zone wherein suitable desulfurization conditions are maintained for the production of a desulfurized hydrocarbon product including hydrogen.

9. The process of claim 8 wherein one of said hydrocarbon stocks is a light hydrocarbon oil and the other hydrocarbon stock is higher boiling than said light hydrocarbon oil.

10. A process for simultaneously desulfurizing dissimilar hydrocarbon stocks and reforming one of said stocks, one of said hydrocarbon stocks being a reformable light hydrocarbon oil, which comprises passing one of said hydrocarbon stocks to a first desulfurization zone wherein it is contacted with a hydrogen containing gas under suitable desulfurization conditions to produce a first desulfurized product including hydrogen, separating hydrogen from the desulfurized product, passing the other hydrocarbon stock to a second desulfurization zone, passing the hydrogen separated from the first desulfurization zone to the second desulfurization zone wherein suitable desulfurization conditions are maintained for the production of a desulfurized product including hydrogen, passing reformable desulfurized product to a reforming zone wherein it is contacted with a suitable reforming catalyst under reforming conditions to produce a reformed liquid product and a net production of hydrogen, and passing the net hydrogen to the first desulfurization zone.

11. A process for upgrading a hydrocarbon feed stream which comprises passing said hydrocarbon feed stream partially vaporized to a conversion zone containing an upper bed of catalytic material and a lower bed of catalytic material, passing the liquid portion of said hydrocarbon feed downwardly through said lower catalyst bed countercurrent to a stream of hydrogen rich gas introduced to the lower portion thereof under suitable conversion conditions to upgrade hydrocarbon feed to a desired product, recovering a liquid hydrocarbon product stream from the bottom of said lower catalyst bed, recovering a hydrogen rich gas stream from the upper portion of said lower catalyst bed and passing the same concurrently with the vaporous portion of said hydrocarbon feed upwardly through said upper catalyst bed under suitable conversion conditions to upgrade the hydrocarbon feed to a desired product and recovering the hydrocarbon product stream containing hydrogen from the upper portion of said upper catalyst bed.

12. In a process for desulfurizing a plurality of dissimilar hydrocarbon feed streams in a plurality of desulfurization zones in the presence of a hydrogen rich gas stream wherein there is a net consumption of hydrogen, the improved method of operation to maintain a high ratio of hydrogen to hydrocarbon feed in each zone which comprises passing one of said hydrocarbon feed streams and hydrogen to the first of said catalytic desulfurization zones under suitable desulfurization conditions to produce a desulfurized hydrocarbon product containing hydrogen, separating a hydrogen rich gas from the desulfurized product, passing the separated hydrogen rich gas with another of said hydrocarbon feed streams to a second catalytic desulfurization zone under suitable desulfurization conditions to produce a second desulfurized hydrocarbon product containing a hydrogen rich gas, recovering a hydrogen rich gas stream from the desulfurized product of the second desulfurization zone and continuing said steps until each of said hydrocarbon feed stocks has been treated with hydrogen rich gas separated from the preceding desulfurization zone.

13. In a process for desulfurizing a sulfur containing feed with hydrogen in the presence of a desulfurization catalyst, the improved method of operation to provide a high ratio of hydrogen to hydrocarbon feed during said desulfurization which comprises separating said hydrocarbon feed into a plurality of parallel hydrocarbon feed streams, passing each of said feed streams to a separate bed of desulfurization catalyst, passing a hydrogen rich gas stream to the first of said catalyst beds in contact with said hydrocarbon feed introduced thereto under desulfurization conditions to produce desulfurized product and hydrogen, separating a hydrogen rich stream from the desulfurized product, passing the separated hydrogen rich stream to the next succeeding catalyst bed to effect desulfurization of the hydrocarbon feed passed thereto, and continuing the sequential passage of hydrogen to each succeeding catalyst bed thereafter until each hydrocarbon feed stream has been treated with a hydrogen rich gas stream and recovering the combined desulfurized hydrocarbon products of each catalyst bed as a product of the process.

References Cited in the file of this patent

UNITED STATES PATENTS

| | | |
|---|---|---|
| 2,143,078 | Lyman | Jan. 10, 1939 |
| 2,285,785 | Seguy | June 9, 1942 |
| 2,293,759 | Penisten | Aug. 25, 1942 |
| 2,355,366 | Conn | Aug. 8, 1944 |
| 2,417,308 | Lee | Mar. 11, 1947 |
| 2,419,029 | Oberfell | Apr. 15, 1947 |
| 2,431,920 | Cole | Dec. 2, 1947 |
| 2,498,559 | Layng | Feb. 21, 1950 |
| 2,516,877 | Horne | Aug. 1, 1950 |
| 2,580,478 | Stine | Jan. 11, 1952 |
| 2,587,149 | Gwynn | Feb. 26, 1952 |
| 2,587,987 | Franklin | Mar. 4, 1952 |
| 2,656,302 | Porter et al. | Oct. 20, 1953 |
| 2,671,754 | De Rosset et al. | Mar. 9, 1954 |
| 2,691,623 | Hartley | Oct. 12, 1954 |
| 2,706,703 | Porter | Apr. 19, 1955 |
| 2,724,683 | Nadro | Nov. 22, 1955 |

U. S. DEPARTMENT OF COMMERCE
PATENT OFFICE

CERTIFICATE OF CORRECTION

Patent No. 2,833,698     James L. Patton et al.     May 6, 1958

It is hereby certified that error appears in the printed specification of the above numbered patent requiring correction and that the said Letters Patent should read as corrected below.

Column 6, line 22, for "stop" read -- top --; column 8, line 25, for "oprtions" read -- portions --; column 9, line 73, for "valve 21" read -- valve 221 --.

Signed and sealed this 24th day of June 1958.

(SEAL)
Attest:

KARL H. AXLINE
Attesting Officer

ROBERT C. WATSON
Commissioner of Patents